Figure 1:
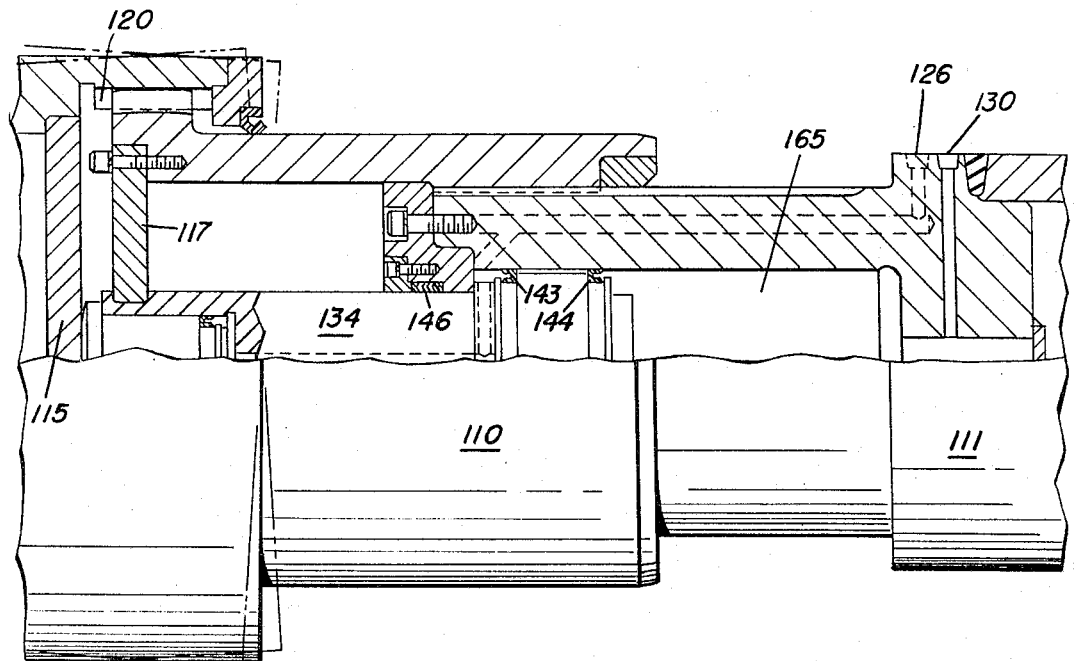

Feb. 14, 1967 J. J. WINKLER 3,303,668
EXTENDIBLE COUPLING
Filed Jan. 21, 1965

INVENTOR.
JOSEPH J. WINKLER
BY
Charles L. Lauercheck
Attorney

[Patent: 3,303,668 — Extendible Coupling, Joseph J. Winkler, Feb. 14, 1967]

3,303,668
EXTENDIBLE COUPLING
Joseph J. Winkler, Erie, Pa., assignor to Zurn Industries, Inc., Erie, Pa., a corporation of Pennsylvania
Filed Jan. 21, 1965, Ser. No. 426,815
10 Claims. (Cl. 64—9)

This invention relates to a unversal gear type coupling and, in particular, to a coupling adapted to be employed in conjunction with and for connecting together in driving relationship the rolls of a rolling mill or the like to the drives associated therewith. The coupling has other and more universal applications, however.

The usual type of couplings presently employed in rolling mill practice are not only difficult to assemble, but there are further disadvantages inherent in such couplings even after they are assembled inasmuch as they are open, and hence do not retain the lubricant therein nor do they prevent foreign material such as dirt, mill grime, etc. from entering the coupling. To avoid some of the foregoing disadvantages it has been proposed to employ a flexible enclosure which is attached to the casing of the coupling and to the spindle proper.

When a roll is to be changed or removed from the mill employing a coupling with this type of enclosure, it is necessary to detach the boot and then slide out the roll with the roll end coupling half casing remaining on the end thereof. If, however, the roll end coupling half were not removed with the roll, but instead were retained intact on the spindle, then the bore end of the coupling will drop downward and thereby cause the casing and spindle to be angularly misaligned. It then becomes necessary, when the end of the roll is to be reinserted in the coupling casing, to raise the bore end of the coupling vertically in order to realign it with the roll. This operation is not only time consuming, but is inconvenient and results in a very unsatisfactory condition.

Previous efforts have been made to solve the foregoing problems by utilizing a spring inside the coupling which urged the relatively moving parts out into alignment during the time that they were being changed. These springs exerted a force on the coupling at all times, were difficult to assemble since the spring had to be compressed, constant wear resulted because of the continued spring pressure, and the coupling could not be easily manipulated manually during assembly.

It is, accordingly, an object of this invention to provide an improved coupling which incorporates novel means having an adjustable hydraulically actuated member therein for selectively exerting a force to hold the parts.

Another object is to provide a coupling for a rolling mill which is adapted to be relatively quickly connected and disconnected from the driving and driven elements of a mill, and which is self-contained for retaining lubricant therein, either when connected or disconnected from the driven and driving elements.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
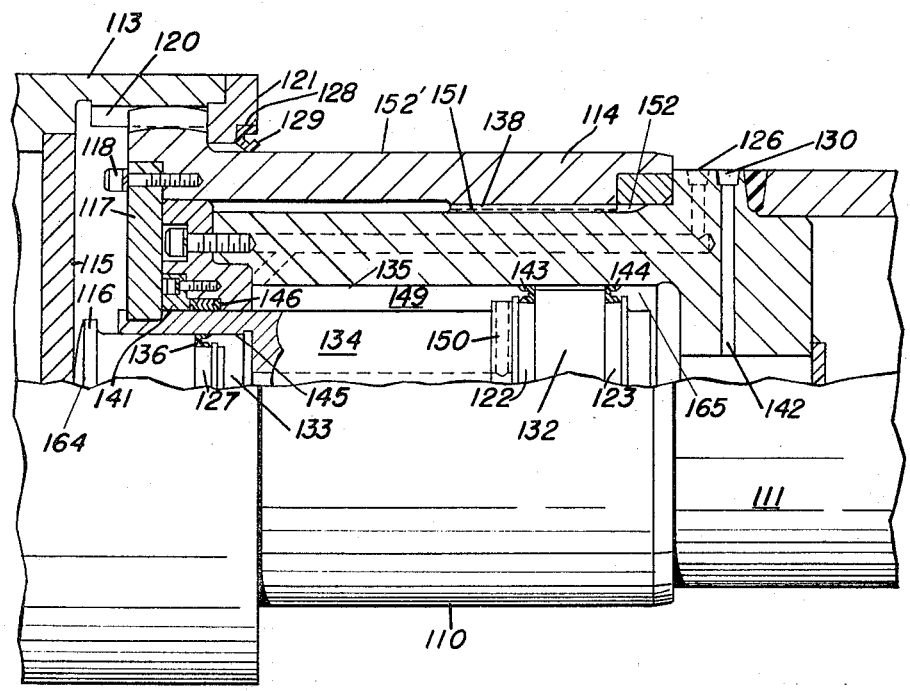

In the drawing:

FIG. 1 is a side view partly in cross section of a coupling showing the shaft adapter extended away from the sleeve; and FIG. 2 is a view similar to FIG. 1 showing the shaft adapter telescoped toward the sleeve.

Now with more particular reference to the drawing, the coupling disclosed in FIGS. 1 and 2 is made up of four assemblies that move relative to each other. These are an internally toothed sleeve 113 which receives the externally toothed hub 110, the thrust button 116, which is slidably received in a cavity in the sleeve, and the shaft adapter 111. The shaft adapter 111 is telescopically received in the hub. The hub has internal splines 151 that slidably engage splines 152 on the shaft adapter 111. The sleeve has the internal teeth 120 which are supported inside a flange and inward of the flange is a counterbore that receives the back-up plate 115. The back-up plate forms a barrier for the thrust button 116. The axial sliding of the hub is limited and the external teeth are limited from moving out of the sleeve by the retainer ring 121 which is fixed to the end of the flange on sleeve 113. The retainer ring 121 has an internal peripheral groove 128 that receives the sealing ring 129. The sealing ring 129 makes sealing engagement with the external cylindrical surface 152' of the hub 110.

The hub 110 is made up of the outer hollow cylindrical member 114 and the cylindrical center member 134 which is disposed in the hollow of the outer hollow cylindrical member 114 concentric and fixed thereto. The cylindrical member 114 has a counterbore on its inner end and this counterbore receives the retainer plate 117 that may be secured to the cylindrical member by studs 118. The plate 117 has a hole in its center which receives the cylindrical center member 134 and cylindrical member 134 is fixed to plate 117. Thus, the retainer plate 117 holds the cylindrical center member 134 in rigid relation concentric to cylindrical center member 134 in rigid relation concentric to member 114 and the members 114 and 134 define a space therebetween. The cylindrical center member 134 has an enlarged cylindrical piston 132 on its end remote from the plate 117 and this cylindrical piston 132 defines one side of the grooves 122 and 123. The grooves 122 and 123 in inner cylindrical member 134 receive sealing rings 143 and 144. These rings make sealing engagement and act as piston rings on the inside of the cylindrical bore 135 in the shaft adapter 111.

The cylindrical member 134 has a cylindrical bore 145 which receives the thrust button 116. The thrust button has a flanged end portion 164 that conforms to a part of a sphere and that engages the outer surface of back-up plate 115 and forms a head on the thrust button. The thrust button has a cylindrical body that terminates in a groove 127. Groove 127 receives the sealing ring 136. The sealing ring 136 provides a piston ring for the thrust button which acts as a piston in the bore 145 and thereby confines fluid in the chamber 133.

The shaft adapter 111 may be attached to a suitable drive or driven member. It has splines 151 that make sliding engagement with the splines 138 on the shaft adapter 111. Thus, the shaft adapter may slide in and out of the hub.

The shaft adapter bore 135 acts as a cylinder when it receives the enlarged cylindrical portion 132 on the cylindrical piston rod member 134 which acts as a piston therein. A retainer ring 147 has an internal groove therein that receives the sealing ring 146. This sealing ring makes sealing engagement with the external surface of the cylindrical member 134. The sealing ring is held in its groove by means of a small ring 141 which is held in place by the studs shown. Thus, a chamber 149 is formed by the inside of the shaft adapter hollow bore defined by the outside of the cylindrical member 134 along with the sealing rings 143 and cylindrical surface of bore 135. A second chamber 165 is provided between the sealing ring 144 and shaft adapter. A third chamber 133 is provided inside the cylindrical bore 145 behind the thrust button.

Fluid under pressure is inserted through the channel 126 which is formed in the shaft adapter. This channel communicates with the chamber 149. Fluid pressure in this chamber will force the shaft adapter to the position shown in FIG. 2.

The chamber 165 is connected by means of channel 142 to the inlet 130. Fluid under pressure inserted into this inlet will communicate with chamber 165 and drive the shaft adapter to the position shown in FIG. 1.

The chamber 149 communicates with chamber 133 through channel 150. Fluid under pressure in chamber 149 will thus be imposed in chamber 133. Thus, the shaft adapter 111 can be moved relative to hub 114 by regulating the fluid pressure in chambers 165 and 149.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for shafts comprising,
   a sleeve adapted to have first means thereon for attaching it to a first shaft,
   said sleeve terminating in a flange at the end remote from said first means,
   internal teeth in said flange,
   a hollow hub having a piston member supported thereon generally concentric to said hub,
   external teeth on said hub engaging said sleeve teeth,
   a hollow generally cylindrical shaft adapter received in said hollow of said hub with said piston slidably received in said hollow shaft adapter,
   fluid means adapted to exert a force on said piston for moving it axially in said hub selectively in either of two directions,
   and means on said hub adapted to engage means on said sleeve when said hub is moved toward said sleeve.

2. A coupling having an internally toothed sleeve and an externally toothed hub having means engaging said internally toothed means and means to connect said hub and sleeve to the adjacent ends of two shafts,
   means comprising hydraulic pressure means for selectively urging said hub toward and away from said sleeve,
   said means selectively urging said hub comprising a piston rod in said hub fixed thereto,
   a piston rod fixing said piston to the end of said hub adjacent said sleeve,
   a shaft adapter slidably received in said hub and having an internal hollow generally cylindrical surface engaging said piston,
   and a chamber defined in said shaft adapter on each side of said piston,
   said hydraulic pressure means adapted to exert a force selectively in said chambers to urge said piston and said hub selectively away or toward said sleeve.

3. The coupling recited in claim 2 wherein
   said piston rod has a central bore therein at the end adjacent said sleeve,
   a thrust button having a cylindrical portion received in said central bore,
   means on said hub adapted to be engaged by said thrust button and hydraulic means communicating with one said chamber for exerting a hydraulic pressure on said thrust button.

4. The coupling recited in claim 2 wherein
   said thrust button terminates in an end that conforms in shape generally to a part of a sphere.

5. The coupling recited in claim 4 wherein
   said sleeve has a flange portion overlying said hub outward of said teeth,
   and sealing means on said flange portion sealingly engaging said hub.

6. In combination, a flexible coupling comprising
   an internally toothed sleeve,
   an externally toothed hub,
   a shaft adapter,
   said toothed hub having external teeth having curved flank surfaces to allow misalignment of said hub with said sleeve,
   said external teeth making meshing engagement with said internal teeth,
   said hub having a first cylindrical bore in its inner end,
   said first bore being closed at the end of said hub adjacent said sleeve,
   a cylindrical center member inside said second bore concentric therewith,
   a thrust button having a cylindrical portion slidably received in said bore in said center member,
   a head on said thrust button engaging said sleeve,
   said shaft adapter having means thereon slidably and non-rotatably received in said bore in said hub,
   said shaft adapter having a cylindrical bore therein receiving said cylindrical center member,
   said center member and said shaft adapter having cooperating means thereon defining a first and a second chamber,
   piston means on said center member separating said first and said second chambers from each other,
   and means communicating with said first and second chambers for admitting fluid under pressure selectively into said chambers whereby said shaft adapter is caused to telescope in said hub.

7. The combination recited in claim 6 wherein,
   said thrust button defines a chamber in said first bore in said hub,
   and means is provided for connecting fluid from said first chamber to said chamber in said hub.

8. The combination recited in claim 6 wherein
   said means slidably and non-rotatably connecting said hub to said shaft adapter comprises external splines on said shaft adapter,
   and internal splines on said hub slidably engaging said external splines.

9. A coupling comprising in combination
   a hub having crowned teeth,
   an internally toothed sleeve receiving said hub teeth,
   a hollow shaft adapter slidably and non-rotatably connected to said hub,
   piston means on said hub received in a bore in said shaft adapter,
   means connecting a source of fluid under pressure to said bore whereby said shaft adapter is slid selectively toward and from said hub,
   and means on said hub limiting its relative movement of said shaft adapter in said sleeve.

10. The combination recited in claim 9 wherein
    said means on said hub limiting its relative movement into said sleeve comprises piston means in said hub extending therefrom,
    means on said piston means engaging said sleeve,
    and fluid means urging said piston means from said hub.

References Cited by the Examiner

UNITED STATES PATENTS

| | | | |
|---|---|---|---|
| 2,371,607 | 3/1945 | Collins | 64—24 |
| 2,372,180 | 3/1945 | Edwards | 64—24 |
| 2,679,734 | 6/1954 | Morey | 64—9 |
| 2,769,323 | 11/1956 | O'Malley | 64—9 |
| 2,845,781 | 8/1958 | O'Brien | 64—9 |

FRED C. MATTERN, Jr., *Primary Examiner.*

HALL C. COE, *Examiner.*